(12) United States Patent
Ramesh et al.

(10) Patent No.: US 10,997,175 B2
(45) Date of Patent: May 4, 2021

(54) METHOD FOR PREDICATE EVALUATION IN RELATIONAL DATABASE SYSTEMS

(71) Applicant: Teradata US, Inc., Dayton, OH (US)

(72) Inventors: Bhashyam Ramesh, Secunderabad (IN); Tirupathi Prabhu Bellapukonda, Hyderabad (IN); Mohan Kumar KJ, Secunderabad (IN); Vamshi Krishna Vangapalli, Milpitas, CA (US)

(73) Assignee: Teradata US, Inc., San Diego, CA (US)

( * ) Notice: Subject to any disclaimer, the term of this patent is extended or adjusted under 35 U.S.C. 154(b) by 229 days.

(21) Appl. No.: 15/633,741

(22) Filed: Jun. 26, 2017

(65) Prior Publication Data
US 2017/0371927 A1 Dec. 28, 2017

Related U.S. Application Data

(60) Provisional application No. 62/354,272, filed on Jun. 24, 2016.

(51) Int. Cl.
*G06F 16/00* (2019.01)
*G06F 16/2453* (2019.01)

(52) U.S. Cl.
CPC .. *G06F 16/24545* (2019.01); *G06F 16/24537* (2019.01)

(58) Field of Classification Search
CPC ........... G06F 15/2454; G06F 15/24537; G06F 15/24545
See application file for complete search history.

(56) References Cited

U.S. PATENT DOCUMENTS

| | | | |
|---|---|---|---|
| 6,289,334 B1 * | 9/2001 | Reiner | G06F 16/24532 |
| 6,449,606 B1 * | 9/2002 | Witkowski | G06F 16/24537 |
| 7,231,557 B2 * | 6/2007 | Jin | H03M 13/116 |
| | | | 714/701 |
| 7,539,704 B2 * | 5/2009 | Brodersen | G06F 16/178 |
| 7,774,346 B2 * | 8/2010 | Hu | G06F 16/2237 |
| | | | 707/745 |
| 8,001,127 B2 * | 8/2011 | Chandrasekar | G06F 16/81 |
| | | | 707/741 |
| 8,046,327 B2 * | 10/2011 | Brodersen | G06F 16/278 |
| | | | 707/615 |
| 8,103,689 B2 * | 1/2012 | Gupta | G06F 16/24539 |
| | | | 707/759 |
| 9,378,243 B1 * | 6/2016 | Korlapati | G06F 16/24545 |
| 10,366,083 B2 * | 7/2019 | Chavan | G06F 16/2455 |
| 10,394,811 B2 * | 8/2019 | Zhang | G06F 16/24532 |
| 10,437,688 B2 * | 10/2019 | He | G06F 11/1666 |
| 2004/0216024 A1 * | 10/2004 | Jin | H03M 13/116 |
| | | | 714/752 |
| 2006/0218123 A1 * | 9/2006 | Chowdhuri | G06F 16/24532 |
| 2009/0319485 A1 * | 12/2009 | Leung | G06F 16/24539 |
| 2013/0117255 A1 * | 5/2013 | Liu | G06F 16/283 |
| | | | 707/714 |

(Continued)

*Primary Examiner* — Jean M Corrielus
(74) *Attorney, Agent, or Firm* — James Stover

(57) ABSTRACT

A method for performing row qualification in database table retrieval and join operations. This method, referred to as bulk qualification, evaluates conditions on multiple rows in a database table at the same time, providing more efficient utilization of memory bandwidth and CPU throughput.

6 Claims, 7 Drawing Sheets

(56) References Cited

U.S. PATENT DOCUMENTS

| | | | |
|---|---|---|---|
| 2015/0089134 A1* | 3/2015 | Mukherjee | G06F 15/8084 |
| | | | 711/114 |
| 2015/0339343 A1* | 11/2015 | Raja | G06F 16/2365 |
| | | | 707/625 |
| 2016/0041906 A1* | 2/2016 | Mukherjee | G06F 16/2379 |
| | | | 711/119 |
| 2016/0350347 A1* | 12/2016 | Das | G06F 12/023 |
| 2017/0031976 A1* | 2/2017 | Chavan | G06F 16/23 |
| 2017/0322999 A1* | 11/2017 | Hase | G06F 16/1805 |
| 2018/0081767 A1* | 3/2018 | He | G06F 3/061 |
| 2018/0232417 A1* | 8/2018 | Das | G06F 12/023 |
| 2018/0349439 A1* | 12/2018 | Zhang | G06F 16/24561 |

\* cited by examiner

METHOD FOR PREDICATE EVALUATION IN RELATIONAL DATABASE SYSTEMS

CROSS REFERENCE TO RELATED APPLICATIONS

This application claims priority under 35 U.S.C. § 119(e) to the following commonly-assigned patent applications, which is incorporated herein by reference:

Provisional Patent Application Ser. No. 62/354,272, entitled "EFFICIENT ALGORITHM TO EVALUATE MULTIPLE PREDICATES IN COLUMNAR DATABASES," filed on Jun. 24, 2016, by Bhashyam Ramesh, Tirupathi Prabhu, Mohan Kumar K C, Ravindar Munjam, Madhava Rao Gubbala, and Vamshi Krishna Vangapalli.

This application is related to the following commonly-assigned patent application, which is incorporated by reference herein:

Application Ser. No. 15/336,063, entitled "BUFFERED DATA-LOADING IN TERADATA COLUMNAR TABLES," filed on Oct. 27, 2016, by Rui Zhang, Sanjay S. Nair, Mamatha Govind Rao, and Paul Sinclair. Application Ser. No. 15/336,063 claims the benefit of Provisional Patent Application Ser. No. 62/246,653, entitled "BUFFERED DATA-LOADING IN TERADATA COLUMNAR TABLES," filed on Oct. 27, 2015, by Rui Zhang, Sanjay S. Nair, Mamatha Govind Rao, and Paul Sinclair.

FIELD OF THE INVENTION

The present invention relates to relational database systems, and more particularly, an improved system and method for predicate evaluation providing more efficient utilization of memory bandwidth and CPU throughput.

BACKGROUND OF THE INVENTION

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information. Within large corporations or organizations, a database system known as an enterprises data warehouse, may contain close to a petabyte of critical data, organized into hundreds of tables, used by many thousands of persons, performing tasks across all business or organization functions. To perform essential functions, it must operate efficiently and reliably every second of every day.

Some database tables may be capable of partitioning database tables by column and by row. This column-oriented storage model provides significant performance benefit to analytic queries that reference a small subset of columns from a table with many columns. To maximize this performance benefit, data is often loaded into column-store tables from conventional row-oriented tables. Typically, periodic ETL tasks are scheduled to perform such data loading. Therefore, the efficiency of executing the loading is of critical importance to the subsequent analytics carried out on the column-store tables.

One major advantage of column-store is that the data belonging to the same column can be tightly packed and stored in consecutive storage space. This storage model enables highly efficient vectorized data manipulation. For instance, in evaluating a predicate that involves a particular column, the runtime executed code that evaluates each value is going to be identical for all the values from this column. Hence evaluating these values in a vectorized manner by retaining a relatively small set of machine instructions from the evaluation routines in CPU cache can yield promising performance benefit.

Traditionally, loading data into a table is considered an I/O-bound task, and loading a column-store table can be highly CPU-intensive. Current processes involving row qualifications or evaluation of predicates on columnar tables, such as during retrieval and join operations, do not access memory efficiently, which in turn affects memory bandwidth and CPU usage.

Additionally, in-memory processing capabilities have recently been implemented within database systems, where data is stored and processed in CPU memory, offering much faster processing times than systems and applications limited to processing data in non-volatile or persistent storages, e.g., Hard Disk Drives (HDDs), Solid State Disk Drives (SSDs), and Flash memory. Described below is an improved method for predicate evaluation in retrieval and join steps compatible with in-memory processing and column-store databases.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
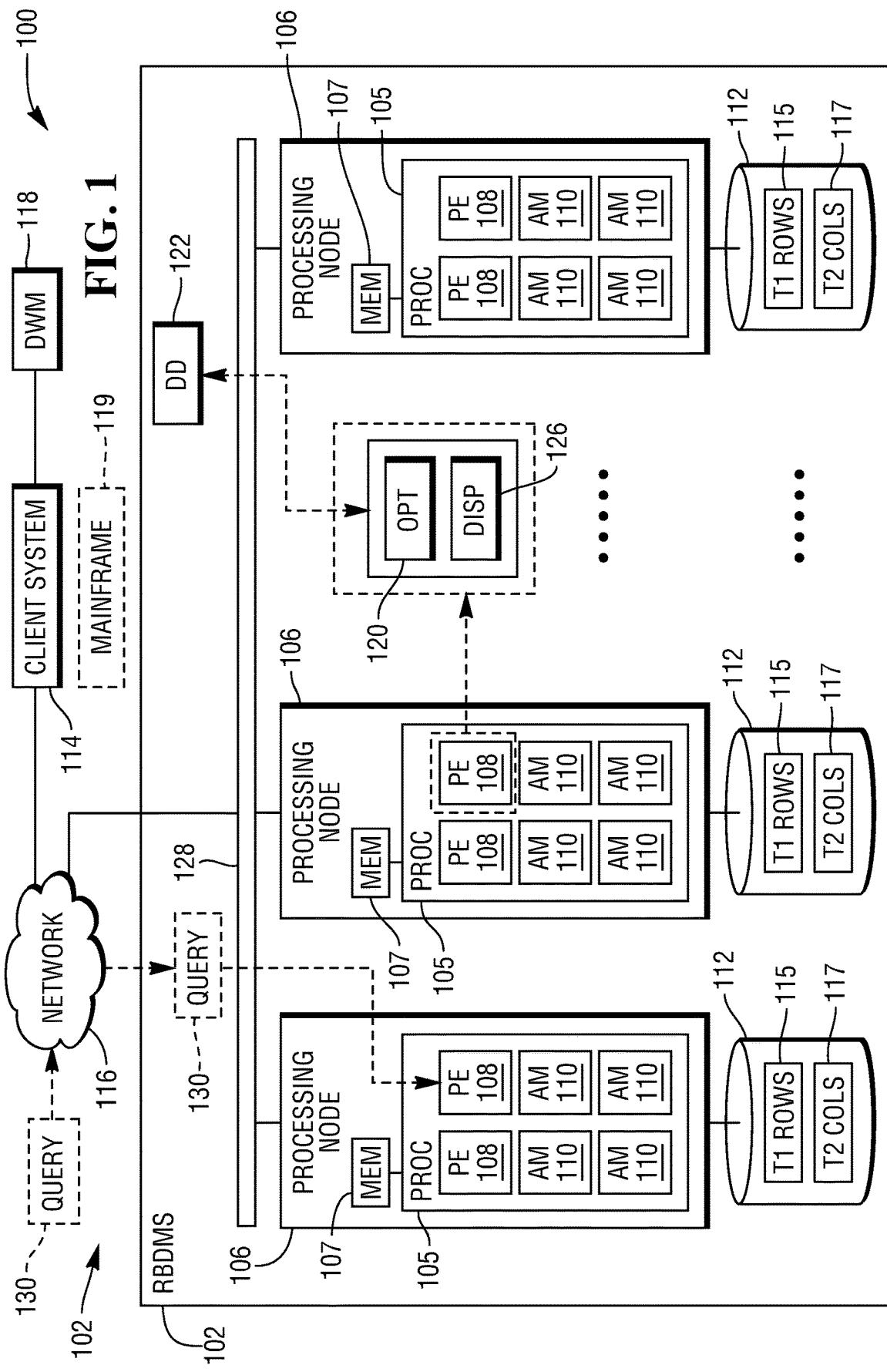
FIG. 1 is a block diagram of an example distributed relational database system.

FIG. 1 is a diagrammatic representation of an example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RBDMS 102 may be a massive parallel processing (MPP) system having an array of processing units and distributed memory. In alternative examples, the RBDMS 102 may implement a single processing unit, such as in a symmetric multiprocessing (SMP) system configuration. The RBDMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive, or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing units such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access module processors (AMPS), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

Figure 4:
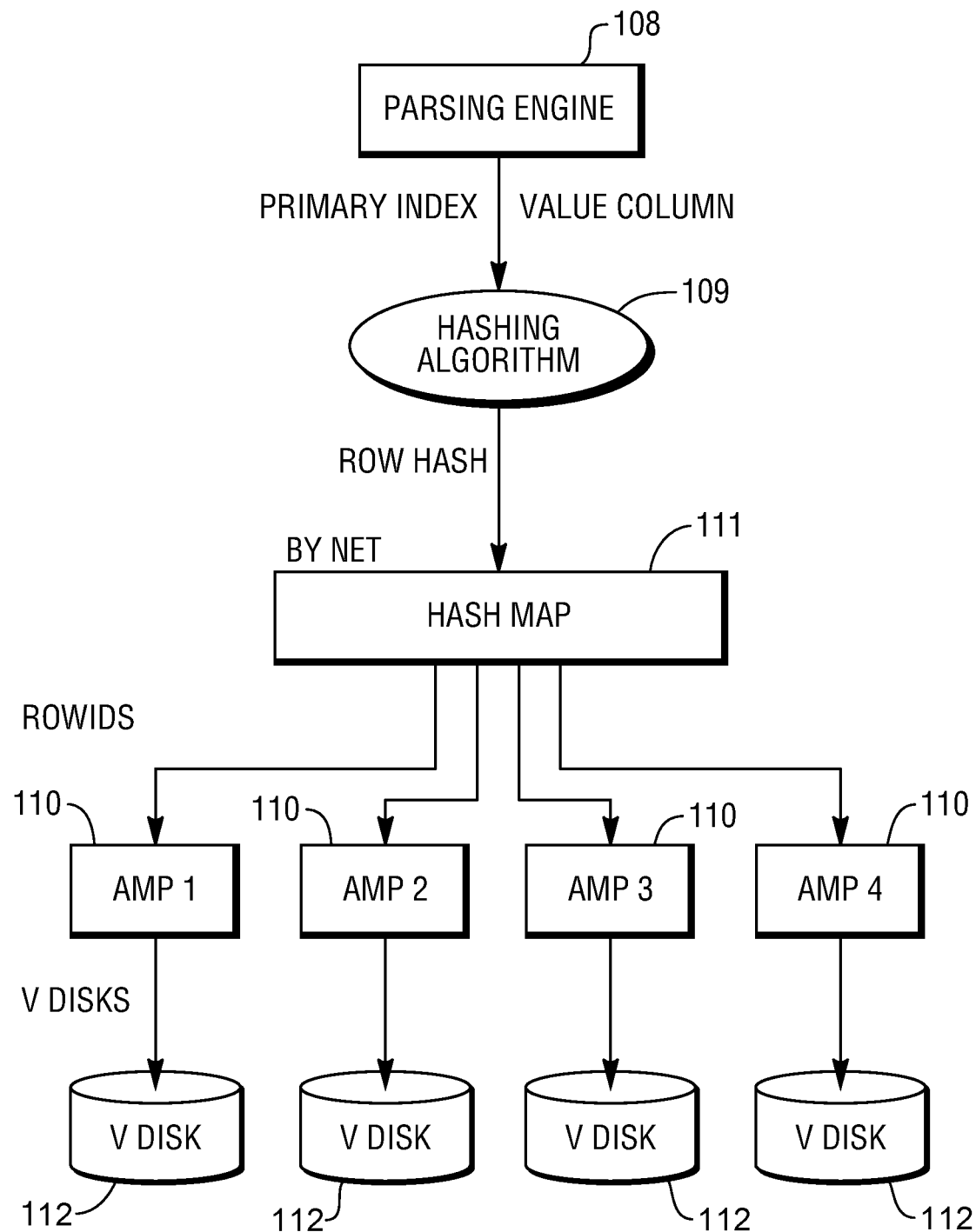
FIG. 4 provides an illustration of a hashing process for distributing records in a table across database modules.

The RBDMS 102 stores data in one or more tables in the DSFs 112. In one example, the database system 100 may be configured to distribute rows across access modules 110 and their associated DSFs 112 in accordance with their primary index. The primary index distributes the records in a table across the AMPs, by hashing the columns that make up the primary index to determine which records go to which AMP. FIG. 4 provides an illustration of this hashing process. A hashing algorithm 109 produces hash values from the values in the columns specified by the primary index. Some portion, possibly the entirety, of the hash value is designated a "hash bucket." The hash buckets are assigned to DSFs 112 and associated access modules 110 by a hash bucket map 111. The characteristics of the columns chosen for the primary index determine how evenly the rows are distributed.

For an access module 110, rows of each stored table may be stored across multiple DSFs 112, such as rows 115 to table T1 and columns 117 of table T2. The rows may be partitioned by row and/or column. Partitioning by rows is determined by one or more user-specified partitioning expressions. Partitioning by column is determined by user-specified grouping of one or more columns into each column partition. Each parsing engine module 108 may organize the storage of data and the distribution of table rows and columns. The parsing engine modules 108 may also coordinate the retrieval of data from the DSFs 112 in response to queries received, such as those received from a client computer system 114 connected to the RBDMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RBDMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RBDMS 102 as well as fields of each database, for example. Further, the data dictionary module 122 may specify the type, length, and/or other various characteristics of the stored tables. The RBDMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary 122 may be stored in the DSFs 112 or some other storage device and selectively accessed.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g., processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally, or alternatively, more than one channel may also allow distributed communication to reduce the possibility of an undesired level of communication congestion among processing nodes 106.

Figure 2:
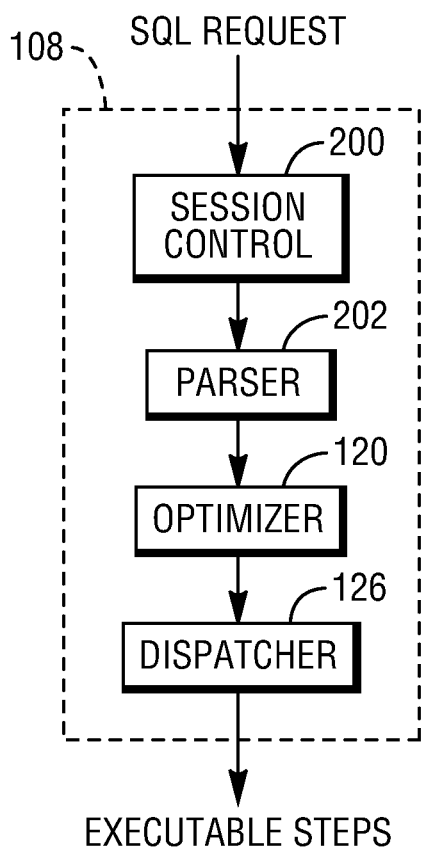
FIG. 2 is a block diagram of a portion of the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
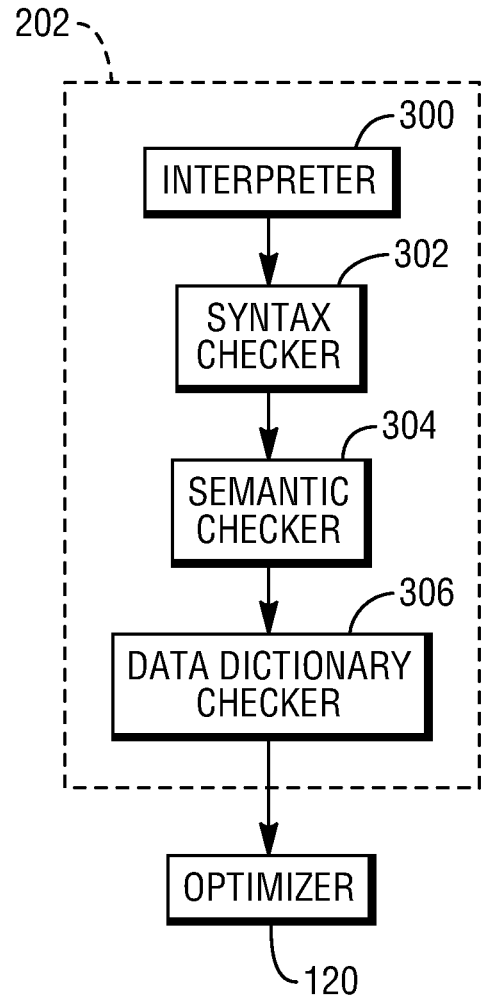
FIG. 3 is a block diagram of another portion of the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

During operation, a query, such as the query 130, or utility may require the database system 100 to perform a row-based operation. This requires relevant rows to be located by a file system and returned for subsequent processing. However, column-partitioning presents issues related to row-processing. As data tables are column-partitioned, partitioned columns of a row may be distributed throughout the DSFs 112 associated with the access module 110 that manages that row. Thus, rows are broken up into the column partitions. Such partitioning requires the access module 110 to spend time gathering each referenced column value of a row in order for the row to be processed.

Columns may be partitioned by the database system 100 and placed into physical storage, or "physical rows," of storage disks of the DSFs 112. In one example, the partitioned columns may be assigned a column partition number. Each column partition may include a number of container rows in which in the column values are stored. The length and number of container rows is dependent upon the number of column values and the size of the column values. When column partitioning a database table, the partitions may vary in placement, such that more than one column may be part of a column partition. Each of the container rows of a column partition may include one or more column partition values. Each column partition value may represent one or a concatenation of more than one column value. During query processing, referenced column-partitioned column values need to be accessed. Thus, these column values may each be associated with an identifier so that the column values can be located when needed.

Figure 5:
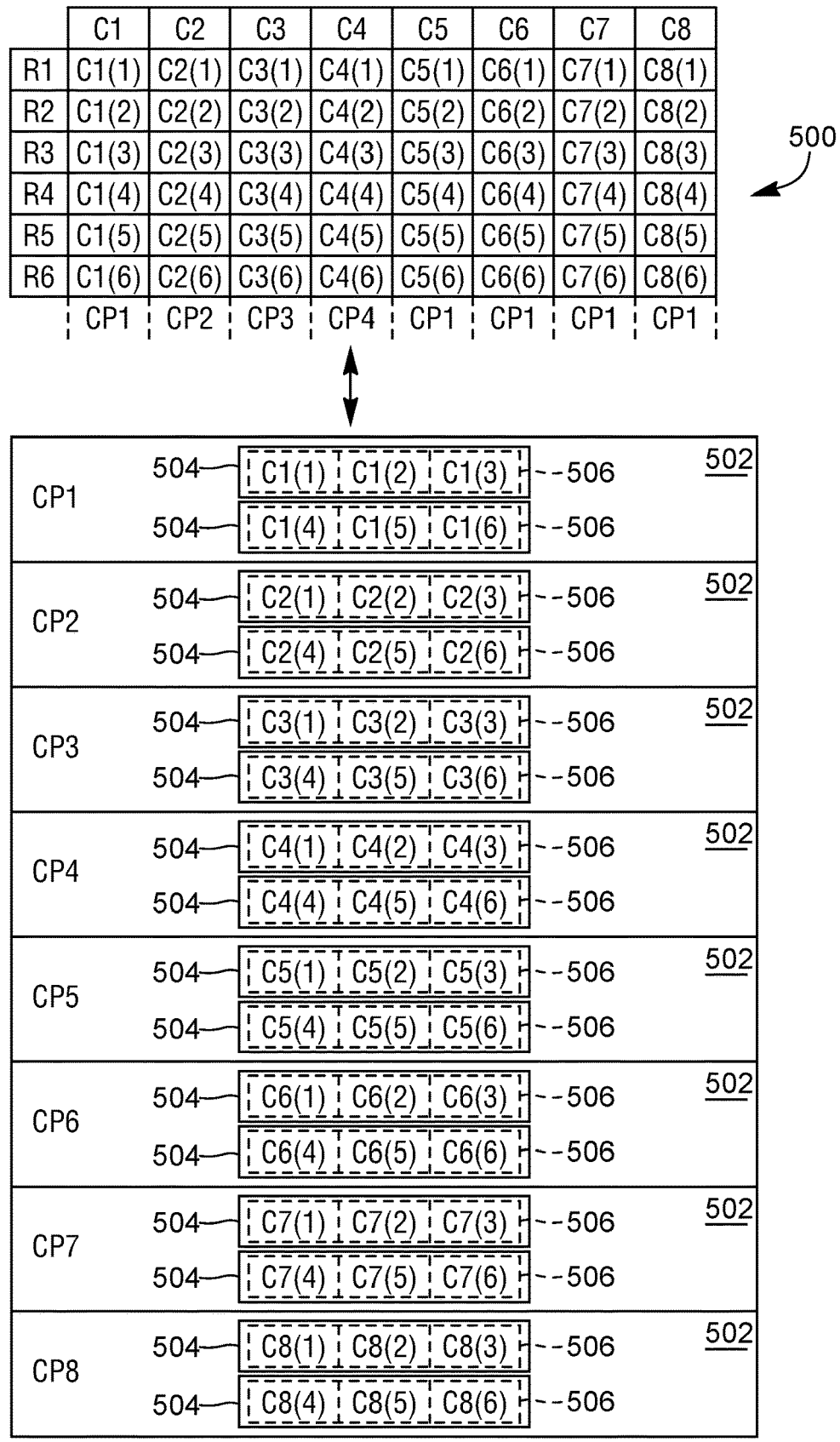
FIG. 5 is an example of column partitioning of a database table.

FIG. 5 shows an example of a table 500 being partitioned into a number of column partitions 502. Table 500 includes six rows, R1 through R6, eight columns C1 through C8. Each column is partitioned into a separate column partition 502. The partitioned column values may be placed into column container rows 504 within each column partition 502. Each container row 504 includes a number of column partition values 506. In FIG. 5, each column partition value 504 may represent one or more column values. In the example in FIG. 5, each column partition value 504 includes a single column entry. Each column partition value 504 may be associated with a unique identifier field referred to as a "rowid." The rowid may be a combination of various other identifiers. In one example, the rowid may include a column partition number, hash bucket value, and a uniqueness value.

Figure 6:
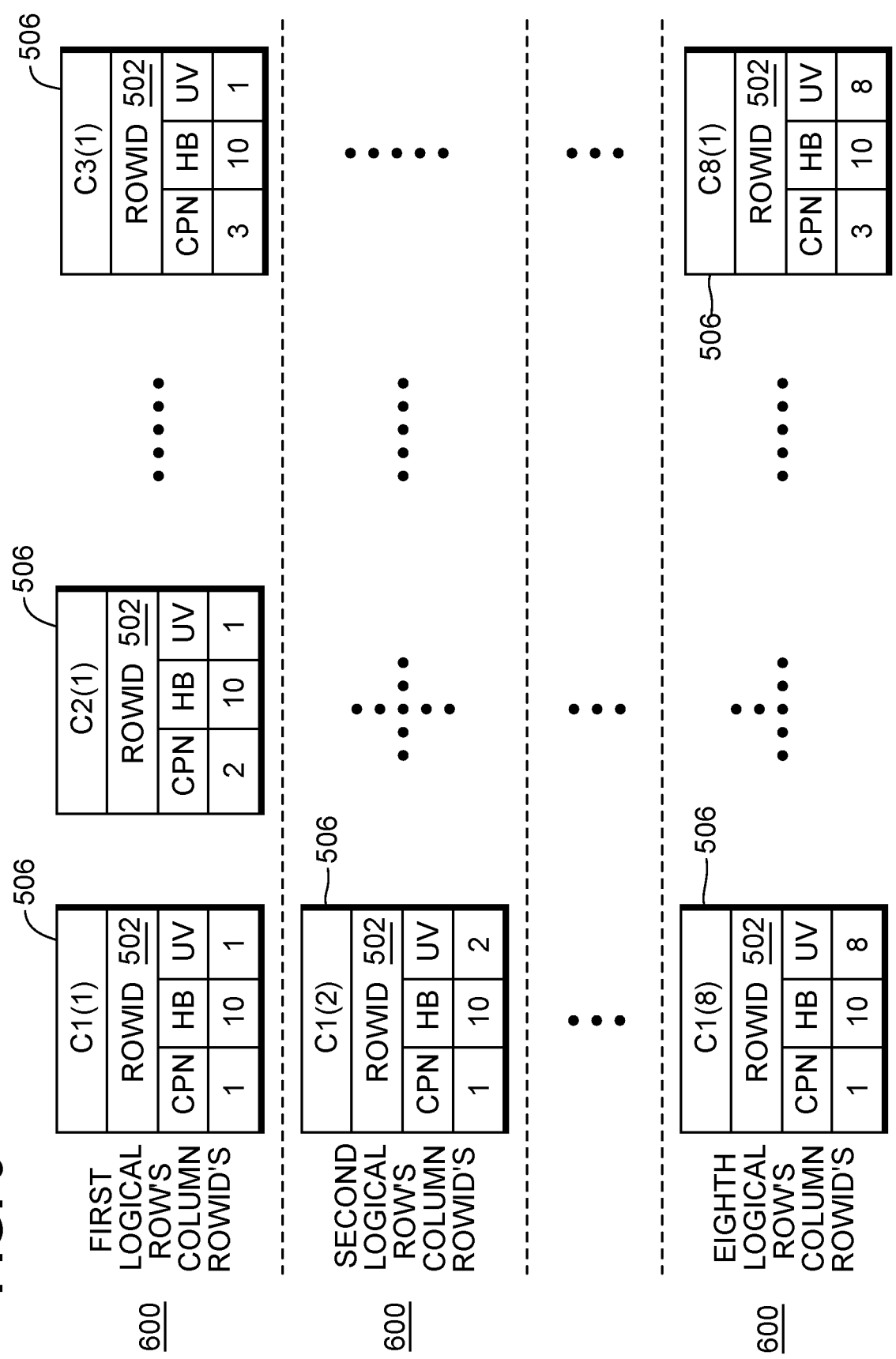
FIG. 6 is an example of a column-partitioned table.

For example, in FIG. 6 table 500 is shown. Each column-partitioned table may be considered to have a "logical row" 600. Thus, while the table is actually partitioned by column, the logical rows give reference to the columns in a row-based environment. In FIG. 6, the columns are partitioned such that there is one column per partition. Thus, each column value in a common column will have the same column partition number (CPN). The rowid 602 of each column value is shown to include the column partition number (CPN). The hash bucket value (HB) may indicate which access module 110 is associated with a particular row for a particular column row. This is typically the same for column-partitioned tables having no primary index. The uniqueness value (UV) allows the column partition value within a particular column partition to be located. For example, the only difference in the rowid's of the first column of table 400 is the uniqueness value. Using this format, a column partition value may be located once the column partition number, hash bucket value, and uniqueness value are known. In the example of FIG. 6, each column partition value 506 may represent a single column value of the table 500. However, in some scenarios, the column partition value 506 may be a concatenation of the multiple column values. In such scenarios, each column value may have a corresponding "fielded" allowing the column value to be located within the particular column partition value.

Figure 7:
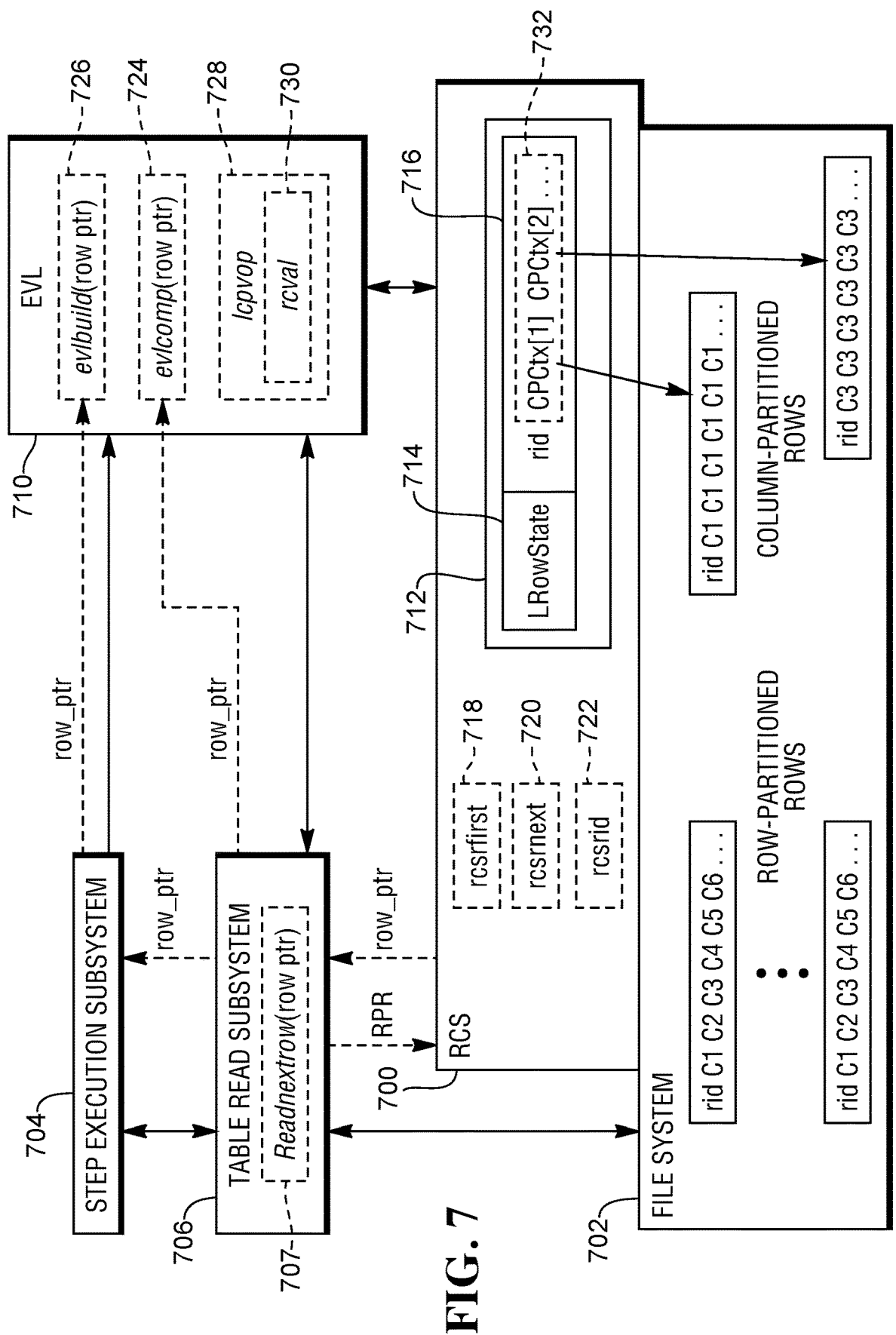
FIG. 7 is an example of a column-partitioned table management software environment implementable on a database system.

FIG. 7 is a block diagram of a row-column subsystem (RCS) 700 that may be used with the file system 702 (which includes DSFs 112) to allow rows of a data table to be assembled with less resource overhead when the data table is column-partitioned. The database system 100 may perform various actions with regard to a row-related query task. For example, a step execution subsystem 704 executed by one or more access modules 110 may be responsible for carrying out each step in responding to a query. In order to carry out these responsibilities, the step execution subsystem 704 may seek out a row pointer (row_ptr) to locate rows needed to respond to the query. The step execution subsystem 704 may interact with a table read subsystem 706, which may be executed by one or more access modules 110, to access a database table. The step execution subsystem 704 may need to read a next row in order to carry out the row-based task. The table read subsystem 706 may return a row pointer (row_ptr) to the step execution subsystem 704 using a function "readnextrow" 707 configured to provide a row pointer to the next row in a database table being accessed.

The table read subsystem 706 may specifically request a row pointer so that the row needed to carry out the row-related task may be located. The table read may be used to read a database table having the rows relevant to the row-related task. In one example, in performing the table read, the table read subsystem 706 may recognize that a table is column partitioned. Thus, row pointers used for non-column-partitioned tables are not applicable. Instead, the table read subsystem 706 may request row pointers to the logical rows associated with column-partitioned tables. In one example, the database system 100 may maintain information about a database table and how it is defined in the data dictionary 122 and the table header for the database table. This information allows the partitioning type of a table to be recognized when the table is being processed.

During the processing of row-related tasks, an evaluator module (EVL) 710, executed by one or more access modules 110, may perform the tasks of evaluating various conditions, such as predicates, in comparison to retrieved rows, as well as building result rows in response to row-related queries. Thus, in operation, the step execution subsystem 704 and the table read subsystem 706 may be responsible for providing the EVL module 710 with row pointers allowing the EVL module 710 to obtain the actual rows of the relevant database tables for subsequent processing.

Upon recognition that rows are needed from a column-partitioned table, the table read subsystem 706 may generate a row pointer request ("RPR") from the RCS 700. The request RPR may specifically request the first non-deleted rowid in a logical row. The RCS 700 may provide a row-level interface to the table read subsystem 706 for the column-partitioned tables. In one example, the RCS 700 may maintain a structure 712. The structure 712 may include a sub-structure LRowState 714 and an array CPCtx 716. The sub-structure 714 may maintain validity of a particular rowid of a logical row and, if valid, the state it is in. Such information may include whether a logical row exists or has been deleted, when the container row 506 with column partition for the logical row of interest have already been located, and if so, whether the column partition value has been located yet or is not within that container row 506. A logical row's rowid and LRowState are set by row-level functions, rcsrfirst 718, rcsrnext 720, and rcsrid 722. The rcsrfist function 718 may be responsible for providing a row pointer to the first non-deleted rowid in a logical row of a relevant table. The rcsrnext 720 may be responsible for providing a row pointer to next non-deleted rowid of the relevant table. The rcsrid function 722 may be responsible for locating the row for a specific logical rowid (for instance, that comes from an index). The array CPCtx 716 contains context information about a particular referenced-column partition and a file context that serves as a cache for the most recent physical row read for the column partition. In other words, the array CPCtx 716 maintains a recent set of column partition values that have already been read from the file system 702.

As table rows are processed, the table read subsystem 706 may call a function evlcomp 724 by the EVL module 710 in which the EVL module 710 determines if a row identified by the row pointer row_ptr qualifies for single-table conditions or join conditions specified in a query being processed. If a row is qualified, the step execution subsystem 704 may call function evlbuild 726 from the EVL 710 to build a result row. Since a logical row does not have actual column values, the EVL 710 may call a function operation lcpvop 728. Internally, the function lcpvop 728 may return a starting address of a column partition value for a logical row's rowid. The function lcpvop 728 may call another function rcval 730 and pass it a value CPCtxIDx 732 that identifies the column partition to read. In one example, CPCtxIDx 732 is an index into the array CPCtx 716 maintained within the logical row. For example, in the array CPCtx 716 in FIG. 7, each array entry CPCtx[1], CPCtx[2], etc., may exist for each column partition that has at least one referenced column. As illustrated in FIG. 7, each instance of CPCtx 716 may contain a physical row from the file system 702.

With the logical row's rowid and a column partition context, the function rcval 730 can determine if another read to the file system 702 needs to be performed to read in the physical row that contains the column partition value for the given rowid and returns the starting address of the column partition value within the container row. Thus, if a physical row containing a column value is already contained within the cache of the array CPCtx 716 in the RCS 700, the function rcval 730 recognizes this, and thus, no read from the file system 702 is required. If the physical row is not in the cache, the file system 702 may be called by the RCS 700 in order to locate and retrieve the physical row. Note that column partitions with no referenced columns for the query do not need to be read by the file system.

As stated earlier, existing processes involving row qualifications or evaluation of predicates on columnar tables, such as during retrieval and join operations, do not access memory efficiently, which in turn affects memory bandwidth and CPU usage.

Predicate Evaluation Using Bulk Engine

In Teradata database systems, the execution engine (AMP) operates on one row at a time for predicate evaluation in retrieval and join steps. The EVL code for predicate evaluation and output row building is provided in the step message for execution. Each row of the table is read into the memory and then the predicate is evaluated on the target row by executing predicate evaluation EVL code, if the row is qualified then the output row is built by executing the build EVL code.

This current row-at-a-time processing for evaluating single table predicates for retrieval and join steps does not access memory efficiently which in-turn affects memory bandwidth. This is caused by the following issues:

1. The amount of software executed between qualifications of each row is high.
2. Data movement between memory and CPU is high.
3. A single data item is processed in each processor cycle.
4. Poor data locality.

Figure 8:
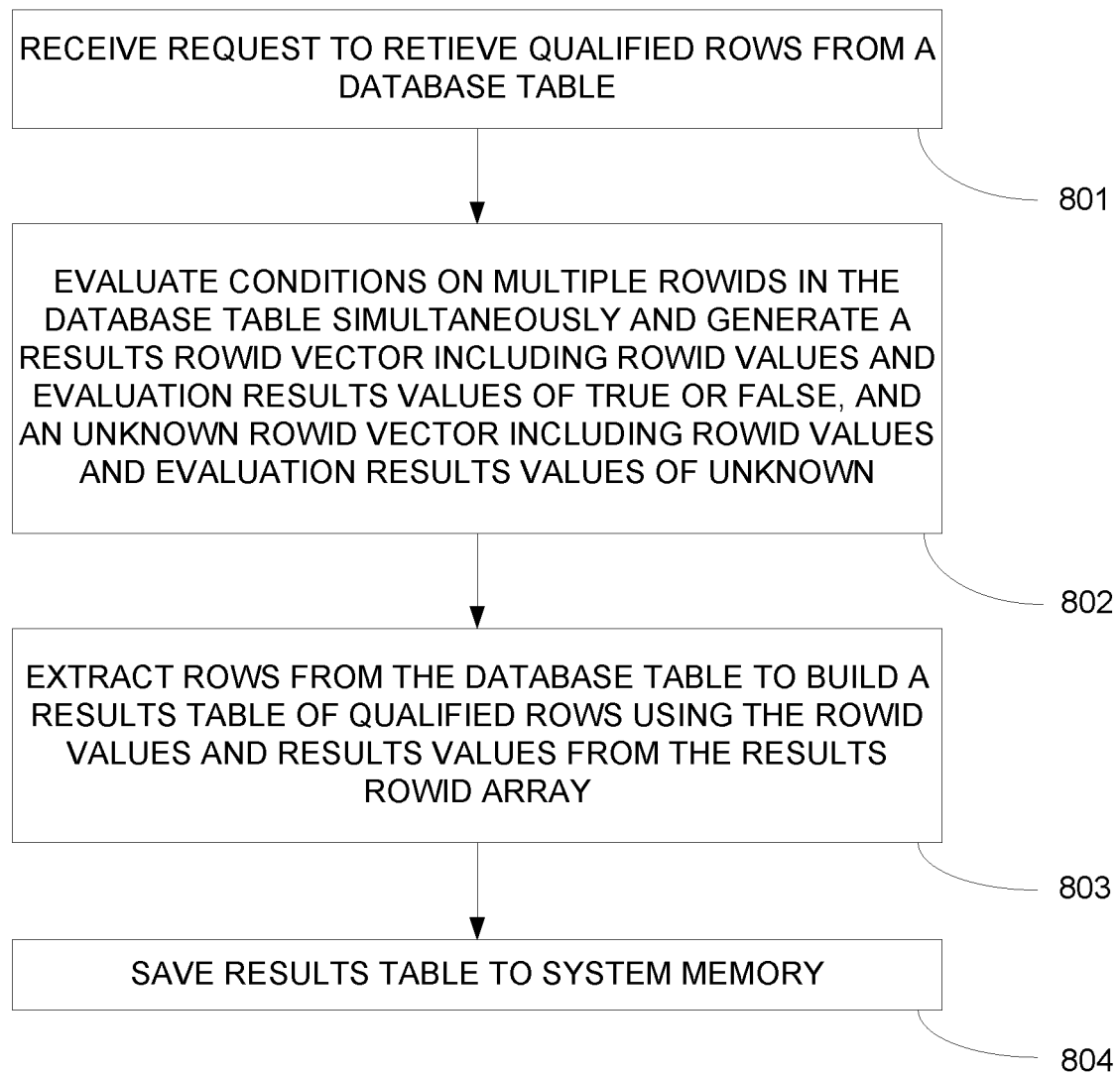
FIG. 8 is a flow diagram illustrating a method for performing row qualification by evaluating predicates in bulk, in accordance with the present invention.

FIG. 8 provides a high-level flow diagram of a method for performing row qualification by evaluating predicates in bulk. This method, referred to as bulk qualification, provides an efficient solution for the above described problems with performing evaluation on a series of rows or values during retrieval and join operations (step 801), reducing software processes in between the qualifications of each row. Bulk qualification helps in accessing memory more efficiently, improving memory bandwidth and thereby CPU throughput. The bulk qualification engine improves memory bandwidth by:

1. Reducing the data movement by curtailing number of load-stores to memory and by performing more operations in CPU cache.
2. Predicate evaluation EVL is executed in a tight loop effectively utilizing the CPU cache as more data is localized (Permanent tables and Spools).
3. Operating on multiple data items at the same time. This increases the number of data elements processed in each processor cycle. Use of vector instructions (SIMD) allows the same instruction to be applied on multiple data items allowing a degree of parallelism and often lead to elimination of conditional branch instructions, reducing branch miss-predictions which in turn improve CPU efficiency.

Bulk qualification uses two new EVL constructs. One is an orchestrator EVL and the other is a worker EVL. The orchestrator EVL, also called as main EVL, consists of new bulk operators called BulkDelOp, BulkOp and a connector operator called BulkConnectorOp.

A BulkOp evaluates single table predicates. It takes a bit array or vector of ROWIDs, typically 256 but can be more, as input. It executes the predicate for each ROWID indicated in the ROWID vector. BulkOp produces two ROWID vectors as output, one indicating the subset of ROWIDs on which the predicate evaluates to a TRUE or FALSE, and another indicating ROWIDs which evaluate to an UNKNOWN result (step 802). Predicates are connected through logical AND, OR, and NOT operations. These are represented with the connector operator BulkConnectorOp.

Each worker part is called a chunk. Each chunk executes a set of EVL instructions to evaluate a predicate. These EVL instructions are very similar to the EVL instructions produced in current database software. In the AMP, BulkOp calls an EVL chunk with ROWID vector as input. The use of vector instructions allows the processing of multiple ROWIDs from the ROWID vector at the same time in an EVL chunk. This reduces the number of iterations of an EVL chunk. The execution of connector logic also uses vector instructions (SIMD).

In the AMP, bulk qualification evaluates a set of conditions on a series of rows using worker EVL which is called from BulkOp. The result of each row evaluation (TRUE, FALSE or UNKNOWN) is returned in two bit arrays (Result bit array and unknown bit array) to the caller such as evlcomp( ). The bit arrays are called ROWID vectors where each bit represents a row. The result-ROWID-vector represents TRUE or FALSE results and the unknown-ROWID-vector represents UNKNOWN results (step 802). A set bit in the result ROWID vector indicates the evaluation for the ROWID is TRUE. A set bit in unknown ROWID vector indicates the evaluation result for the ROWID is UNKNOWN. Bulk qualification callers interpret the result for a ROWID using these ROWID vectors. The result ROWID vector is used to build the qualified rows also in a tight loop which is called bulk building of resultant rows (step 803).

AMP execution of bulk qualification has the following steps:
a. AMP determines a set of undeleted ROWIDs using the BulkDelOp and represents them in the ROWID vector in the logical row. BulkDelOp is the first EVL operator in the main EVL. The main EVL consists of other EVL operators which are executed from step b) onwards.
b. AMP executes the remaining EVL from the main EVL. These consist of a series of BulkOp and BulkConnectorOp.
c. For each predicate marked for bulk qualification a new bulk EVL runtime function is called. This function repeatedly calls a chunk of executable EVL code (EVL chunk) for the predicate representing the bulkable conditions.
d. The EVL chunk for each BulkOp is available in the step message. AMP determines the pointer to the EVL chunk applicable for this BulkOp from the information in the step message. The EVL chunk is either a regular EVL or an EVL with vector instructions (SIMD).
e. Each EVL chunk returns the result of its execution in the resultant ROWID vectors. It also returns the number of ROWIDs analyzed in each call. The result of EVL evaluation is a TRUE, FALSE, or UNKNOWN for a ROWID. The execution of a non-vector EVL chunk returns this result for each ROWID. A vector EVL chunk returns a result array and a presence bit array.
f. Each BulkOp function interprets the results from the EVL chunk and represents the evaluated ROWID in two bit vectors—result-ROWID-vector and unknown-ROWID-vector. Each bit in a ROWID vector represents a logical ROWID or logical row. The two ROWID vectors are in the logical row. An EVL chunk can return more than one value when the chunk executes vector instructions (SIMD).
g. The BulkOp function repeatedly executes the EVL chunk until all the input RIDs represented in the input ROWID vector (bit array) are exhausted.

The main EVL takes care of connecting each bulk result with AND, OR, and NOT using the BulkConnectorOp. At the end of the main EVL execution two bit vectors are produced to represent the qualified ROWIDs. These resultant ROWID vectors are consumed to produce the resultant rows.

The resultant ROWID vectors produced by the bulk evaluation engine are consumed by the callers to produce the resultant rows. Output rows are built in a tight loop by calling the build EVL for each qualified ROWID based on the resultant ROWID vector, these rows are buffered and sent to the response processing sub system which process them in one go. A bunch of rows are built after completing an iteration of bulk qualification by reducing the calls to response processing sub-system.

BulkDelOp is only applicable to CP tables as they have logically deleted rows. BulkDelOp is not needed for bulk evaluation on row tables. As multiple rows have to be evaluated for bulk qualification, bulk delete in AMP identifies a bunch of delete and non-deleted rows which are marked in a ROWID vector called delete-ROWID-vector. The bulk evaluation engine uses this vector as input to load the values and compare in a tight loop.

Null Evaluation Using Vector Instructions (SIMD)

In columnar databases data is partitioned and stored either in single column partitions or multi-column partitions. Qualification is performed row-at-a-time for retrieval and joins steps using generated executable code sent to the execution engine (AMP) from the parser. The generated executable code is called EVL in Teradata database systems, and differently in other systems. Qualification results in a tri-state value: TRUE, FALSE or UNKNOWN. EVL returns this tri-state value as the result of qualification. The EVL code also checks data presence bits to determine NULL values in column partitions involved in the selection predicate. Handling NULL values always implies a tri-state result, TRUE, FALSE or UNKNOWN, for qualifications.

The bulk qualification process, described above, performs predicate evaluation in bulk using SIMD instructions. SIMD comparison instructions produce either TRUE or FALSE results whereas the database comparison operator is a tri-state logic, i.e., it can produce TRUE, FALSE or UNKNOWN outputs. This is an issue when using SIMD instructions for predicate evaluations since SIMD instructions do not understand NULL values.

The bulk qualification and SIMD predicate evaluation produces a result ROWID vector in which each bit represents either TRUE or FALSE. To produce the tri-state (TRUE, FALSE, UNKNOWN) logic for a database result, the data presence bits are also evaluated to check whether any NULL values exist in the operand's data before comparison and another bit vector is produced called an unknown ROWID vector.

The NULL data indicators are available in two levels for the predicate evaluation EVL. In the higher level, a TRUE bit indicates a whole column partition value is NULL. In the second level, the presence bytes have the NULL indicators in each multi-column value.

Multiple presence bytes for multi-column partition values are loaded into vector registers and operated using vector instructions. The presence bit mask is bitwise-ANDed with the presence byte of the data and the result is compared with zero. If the evaluation results in TRUE, then the value is present in the container row and corresponding data values are loaded into vector registers for predicate evaluation otherwise the data values are not loaded. NULL bit indicators are set based on the results.

The predicate evaluation is performed on the actual data values. The results are interpreted overwriting the result of the data values which are NULL as false using the NULL bit indicators. The result is propagated into the result ROWID vector. NULL indicators bits are propagated into unknown ROWID vector which is used to maintain the UNKNOWN result state.

Algorithm for NULL determination:
LOAD 4 presence bytes into XMM1 register
Broadcast present bit mask into XMM2
XMM1=Bitwise AND (XMM1, XMM2)
Broadcast zero into XMM2
XMM1=CompareEQ (XMM1, XMM2)
NullBits=movmskbits (XMM1)//Extract bits from XMM1 into NullBits variable Typical predicate evaluation in tuple at a time execution model checks first if the data is present, i.e., is not NULL, and then executes the predicate. This can result in instruction cache as well as data cache misses. The solution described above evaluates the UNKNOWN bit vector in a few continuous instructions without any jumps. The bit vectors involved are small to fit into processor cache thus avoiding cache misses. Instruction cache misses are avoided since conditional logic is no longer required.

The foregoing description of the invention has been presented for purposes of illustration and description. It is not intended to be exhaustive or to limit the invention to the precise form disclosed.

Additional alternatives, modifications, and variations will be apparent to those skilled in the art in light of the above teaching. Accordingly, this invention is intended to embrace all alternatives, modifications, equivalents, and variations that fall within the spirit and broad scope of the attached claims.

What is claimed is:

1. A method for performing predicate evaluation in a relational database system, the method comprising the steps:
   receiving, by a processor, a row-related query;
   generating, by said processor, a request to retrieve qualified rows from a database table, said qualified rows comprising rows relevant to said row-related query;
   in response to said request, evaluating a set of conditions on multiple rows in said database table simultaneously and generating a results ROWID vector including ROWID values and results values for said evaluation;
   building a set of qualified rows from said database table using said ROWID values and results values from said results ROWID vector; and
   providing said set of qualified rows to said processor for subsequent processing of said query.

2. The method for performing predicate evaluation in a relational database system according to claim 1; wherein said results values comprise TRUE or FALSE values.

3. The method for performing predicate evaluation in a relational database system according to claim 2; the method further including the step:
   generating an unknown ROWID vector including ROWID values and results values of UNKNOWN.

4. The method for performing predicate evaluation in a relational database system in accordance with claim 1; wherein:
   said set of qualified rows provided to said processor for subsequent processing of said query are read into processor memory.

5. The method for performing predicate evaluation in a relational database system in accordance with claim 1; wherein:
   said database table comprises a column store table.

6. The method for performing predicate evaluation in a relational database system according to claim 1, wherein:
   said row-related query comprises a table join operation.

* * * * *